3,636,038
4'-CYANO-5-HALO-3-PHENYLSALICYLANILIDES

Jack D. Early, Bethesda, and John P. Chupp, Kirkwood, Md., assignors to Monsanto Company, St. Louis, Mo.
No Drawing. Original application Aug. 8, 1967, Ser. No. 659,040, now Patent No. 3,525,766, dated Aug. 25, 1970. Divided and this application July 28, 1969, Ser. No. 860,458
Int. Cl. C07c *121/74*
U.S. Cl. 260—465 D       3 Claims

ABSTRACT OF THE DISCLOSURE

Compounds characterized by a 5-halo-3-phenylsalicylanilido nucleus, the anilido group of which having substituents of the group nitro, cyano and trifluoromethyl. These compounds are useful as gastropodicides.

---

This application is a division of copending application Ser. No. 659,040, filed Aug. 8, 1967, now U.S. Pat. 3,525,-766 which latter application is a division of copending application Ser. No. 495,678, filed Oct. 13, 1965, now U.S. Pat. 3,382,145.

This invention relates to substituted 5-halo-3-phenylsalicylanilides of the structural formula

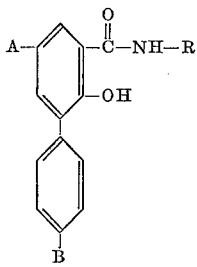

wherein A is halogen of atomic weight in the range of 35 to 80 (that is chloro or bromo, but preferably chloro); wherein B is hydrogen or, and preferably, halogen of atomic weight in the range of 35 to 80 (that is chloro or bromo, but preferably chloro); and wherein R is mono-nitrophenyl or mono-cyanophenyl or mono-trifluoromethylphenyl, but preferably mono-nitrophenyl, which substituted phenyl groups can be further substituted with substituents of the group methyl, halogen of atomic weight in the range of 18 to 80 (that is fluoro, chloro or bromo, but preferably chloro), or a single unlike member of the group nitro, cyano and trifluoromethyl. As illustrative of such are (a) 

wherein D is hydrogen, methyl or, and preferably, halogen of atomic weight in the range of 18 to 80 (that is fluoro, chloro or bromo, but preferably chloro); wherein E is nitro or cyano; and but when E is cyano then at least one of D and aforesaid B is halogen of their respective aforedescribed halogen significances for same;

(b) 

wherein G is methyl or, and preferably, halogen of atomic weight in the range of 18 to 80 (that is fluoro, chloro or bromo, but preferably chloro); wherein J is trifluoromethyl or, and preferably, nitro; and but when J is trifluoromethyl then G is halogen of atomic weight in the range of 18 to 80 (that is fluoro, chloro or bromo, but preferably chloro); and

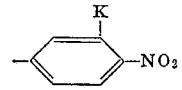

wherein K is halogen of atomic weight in the range of 18 to 80 (that is fluoro, chloro or bromo, but preferably chloro) or, and preferably, trifluoromethyl.

The compounds of this invention are prepared by reacting substantially one mole of a substituted 3-phenylsalicylic acid of the structural formula

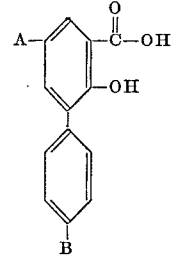

wherein A and B have the aforedescribed significance with substantially one mole of a substituted aniline of the formula R—NH$_2$ wherein R has the aforedescribed significance in the presence of from about 0.1 to about 1.0 mole of phosphorus trichloride and an inert aromatic organic liquid (for example, benzene, toluene, xylene, chlorobenzene, dichlorobenzene, trichlorobenzene, and the like, and mixtures thereof) at a temperature in the range of from about 60° C. to about 200° C. The substituted 3-phenylsalicylanilides so obtained are solids generally melting above 100° C. and are insoluble in water.

As illustrative of the preparation of the compounds of this invention is the following:

EXAMPLE I

To a suitable reaction vessel equipped with an agitator, thermometer and reflux condenser is charged 11.3 parts by weight of 5-chloro-3-(4-chlorophenyl)salicyclic acid and 111 parts by weight of chlorobenzene. The so charged mass is heated with agitation to 70° C. and thereto is added 4.75 parts by weight of 4-cyanoaniline followed by 2.6 parts by weight of phosphorus trichloride in 22 parts by weight of chlorobenzene. The mass is then refluxed for about 5.5 hours, then cooled to about 70° C. whereupon and with agitation about 50 parts by weight of water and about 50 parts by weight of 20 percent hydrochloric acid is added. The mass is permitted to stand for about 15 minutes. The organic layer is separated and washed first with water and then with dilute aqueous sodium bicarbonate and finally with water. The so-washed organic mass is then stripped of volatiles under vacuum. The residue is then recrystallized from a dioxane-water mixture to give 4'-cyano-5-chloro-3-(4-chlorophenyl)salicylanilide, M.P. 283–286° C.

EXAMPLE II

Employing the procedure of Example I but replacing 4-cyanoaniline with an equimolecular amount of 2-chloro-4-cyanoaniline there is obtained 4'-cyano-2',5-dichloro-3-(4-chlorophenyl)salicylanilide, M.P. 257–259° C.

EXAMPLE III

Employing the procedure of Example I but replacing 4-cyanoaniline with an equimolecular amount of 3-trifluoromethyl-4-nitroaniline and recrystallizing the residue from an ethanol-water mixture there is obtained 3'-trifluoromethyl - 4'-nitro-5-chloro-3-(4-chlorophenyl)salicylanilide, M.P. 175–176° C.

EXAMPLE IV

Employing the procedure of Example I but replacing 4-cyanoaniline with an equimolecular amount of 2-chloro-4-nitroaniline and recrystallizing the residue from methylcyclohexane there is obtained 4'-nitro-2',5-dichloro-3-(4-chlorophenyl)salicylanilide, M.P. 208–210° C.

EXAMPLE V

Empolying the procedure of Example I but replacing 4-cyanoaniline and 5-chloro-3-(4-chlorophenyl)salicylic acid, respectively, with equimolecular amounts of 4-nitroaniline and 5-chloro-3-phenylsalicylic acid there is obtained 4'-nitro-5-chloro-3-phenylsalicylanilide, M.P. 216–219° C.

EXAMPLE VI

Employing the procedure of Example I but replacing 4-cyanoaniline with an equimolecular amount of 2-chloro-5-nitroaniline there is obtained 5'-nitro-2',5-dichloro-3-(4-chlorophenyl)salicylanilide, M.P. 212–214° C.

EXAMPLE VII

Empolying the procedure of Example I but replacing 4-cyanoaniline and 5-chloro-3-(4-chlorophenyl)salicylic acid, respectively, with equimolecular amounts of 2-chloro-4-nitroaniline and 5-chloro-3-phenylsalicylic acid there is obtained 4'-nitro-2',5-dichloro-3-phenylsalicylanilide, M.P. 192–193° C.

In a similar manner to that aforedescribed the following substituted 5-halo-3-phenylsalicylanilides of this invention are obtained from the appropriate substituted aniline and the appropriate 5-halo-3-phenylsalicylic acid:

4'-cyano-2',5-dichloro-3-phenylsalicylanilide, M.P. 205–207° C.
4'-cyano-2'-chloro-5-bromo-3-phenylsalicylanilide, M.P. 205–207° C.
4'-cyano-2'-fluoro-5-chloro-3-phenylsalicylanilide,
4'-cyano-2'-fluoro-5-chloro-3-(4-chlorophenyl)salicylanilide,
4'-cyano-2'-bromo-5-chloro-3-(4-chlorophenyl)salicylanilide,
4'-nitro-5-bromo-3-phenylsalicylanilide,
4'-nitro-2'-methyl-5-chloro-3-(4-chlorophenyl)salicylanilide,
4'-nitro-2',5-dibromo-3-phenylsalicylanilide,
4'-nitro-2'-fluoro-5-chloro-3-phenylsalicylanilide,
4'-nitro-2'-chloro-5-bromo-3-phenylsalicylanilide, M.P. 183–185° C.
4'-nitro-2'-fluoro-5-chloro-3-(4-chlorophenyl)salicylanilide,
4'-nitro-2',5-dichloro-3-(4-bormophenyl)salicylanilide, M.P. 233–235° C.
5'-nitro-2',5-dichloro-3-phenylsalicylanilide, M.P. 180–183° C.
5'-nitro-2'-methyl-5-chloro-3-phenylsalicylanilide, M.P. 183–185° C.
5'-nitro-2'-fluoro-5-chloro-3-phenylsalicylanilide,
5'-nitro-2'-methyl-5-chloro-3-(4-chlorophenyl)salicylanilide, M.P. 230–231° C.
5'-nitro-2'-fluoro-5-chloro-3-(4-chlorophenyl)salicylanilide,
5'-nitro-2',5-dibromo-3-(4-chlorophenyl)salicylanilide,
5'-trifluoromethyl-2',5-dichloro-3-phenylsalicylanilide,
5'-trifluoromethyl-2'-fluoro-5-chloro-3-phenylsalicylanilide,
5'-trifluoromethyl-2',5-dichloro-3-(4-chlorophenyl)salicylanilide, M.P. 177–179° C.
5'-trifluoromethyl-2'-fluoro-5-chloro-3-(4-chlorophenyl)salicylanilide, M.P. 140–141° C.
4'-nitro-3',5-dichloro-3-phenylsalicylanilide, M.P. 182–185° C.
4'-nitro-3',5-dibromo-3-phenylsalicylanilide,
4'-nitro-3',5-dichloro-3-(4-chlorophenyl)salicylanilide,
4'-nitro-3'-fluoro-5-chloro-3-(4-chlorophenyl)salicylanilide,
4'-nitro-3'-trifluoromethyl-5-chloro-3-phenylsalicylanilide, M.P. 147–149° C.
4'-nitro-3'-trifluoromethyl-5-bromo-3-phenylsalicylanilide,
4'-nitro-3'-trifluoromethyl-5-bromo-3-(4-chlorophenyl)salicylanilide,
4'-nitro-3'-trifluoromethyl-5-chloro-3-(4-bromophenyl)salicylanilide.

In the process of this invention the methods by which the compounds of this invention are isolated will vary slightly with the reactants employed and the product produced. Further purification by selective solvent extraction or by absorptive agents such as activated carbon or clays can precede the removal of the inert organic liquid (or solvent) when the latter is employed in the reaction system. Additionally an inert organic solvent can be added to the reaction product along with absorptive agents for purification purposes. However, the crude reaction product is generally satisfactory for gastropodicidal purposes without purification.

The compounds of this invention are particularly useful in destroying gastropods, that is the class of animal life Gastropoda within the phylum Mollusca, which cause considerable agricultural and horticultural damage, and particularly the snails of this class of animal life which are the necessary intermediate host or vector in the life cycle of various common parasites, as for example the trematodes or flukes which are parasitic in man and animals causing schistomiasis and like diseases.

As illustrative of the gastropodicidal properties of the compounds of this invention as compared to analogous and/or position isomers thereof, which respectively are prepared by the same process as that of the compounds of this invention employing the appropriate substituted aniline and the appropriate substituted salicylic acid, is the following:

Evaluation I

Three snails (*Planobarius corneus*, which is the species of snail host of the cyclocoolid *Tracheophilus sisowi*, the blood fluke *Bilharziella polonica* and several other trematodes) of 6 to 8 weeks of age are placed in a 200 x 32 mm. glass tube (two replicates each of said three snails) and thereto is added the compound to be evaluated in the form of an aqueous dispersion thereof having a concentration of 0.1 part per million, that is p.p.m. (This dispersion is prepared by dissolving and/or dispersing sufficient of the particular compound in 10 ml. of acetone to make a one percent by weight solution or mixture thereof and then adding sufficient water to give dispersions of the following tabulated concentration.) The percent kill (that is the average of two replicates of said three snails) at the end of 24 hours at room temperature for each of the following itemized compounds at a 0.1 part per million concentration was found to be as follows:

| No. | Compound (melting point, ° C.) | Percent kill at 0.1 p.p.m. |
|---|---|---|
| 1 | 4'-cyano-2',5-dichloro-3-phenylsalicylanilide | 100 |
| 2 | 4'-cyano-2'-chloro-5-bromo-3-phenylsalicylanilide | 100 |
| 3 | 4'-cyano-5-chloro-3-(4-chlorophenyl)salicylanilide | 100 |
| 4 | 4'-cyano-2',5-dichloro-3-(4-chlorophenyl)salicylanilide | 100 |
| 5 | 4'-nitro-5-chloro-3-phenylsalicylanilide | 100 |
| 6 | 4'-nitro-2',5-dichloro-3-phenylsalicylanilide | 100 |
| 7 | 4'-nitro-2'-chloro-5-bromo-3-phenylsalicylanilide | 100 |
| 8 | 4'-nitro-2',5-dichloro-3-(4-chlorophenyl)salicylanilide | 100 |
| 9 | 4'-nitro-2',5-dichloro-3-(4-bromophenyl)salicylanilide | 100 |
| 10 | 4'-nitro-2',5-dichlorosalicylanilide (233) | 42 |
| 11 | 4'-nitro-2',5-dichloro-3-methylsalicylanilide (244–246) | 22 |
| 12 | 4'-nitro-2',3-dichlorosalicylanilide (205–206) | 0 |
| 13 | 4'-nitro-2',3,5-trichlorosalicylanilide (229–230) | 0 |
| 14 | 4'-cyano-5-chloro-3-phenylsalicylanilide (264) | 0 |
| 15 | 3'-nitro-5-chloro-3-phenylsalicylanilide (198–201) | 0 |
| 16 | 2'-nitro-4'-trifluoromethyl-5-chloro-3-(4-chlorophenyl)salicylanilide (178–179) | 0 |
| 17 | 2'-trifluoromethyl-4',5-dichloro-3-(4-chlorophenyl)salicylanilide (165–168) | 0 |
| 18 | 2'-trifluoromethyl-4'-fluoro-5-chloro-3-(4-chlorophenyl)salicylanilide (158–160) | 0 |
| 19 | 2',4',5-trichloro-3-(4-chlorophenyl)salicylanilide (240–242) | 0 |

| No. | Compound (melting point, ° C.) | Percent kill at 0.1 p.p.m. |
|---|---|---|
| 20 | 4'-thiocyano-5-chloro-3-(4-chlorophenyl)salicylanilide (255–257). | 0 |
| 21 | 5'-nitro-2'-methyl-5-chloro-3-phenylsalicylanilide. | 70 |
| 22 | 5'-nitro-2',5-dichloro-3-(4-chlorophenyl)salicylanilide. | 100 |
| 23 | 5'-trifluoromethyl-2',5-dichloro-3-(4-chlorophenyl)salicylanilide. | 70 |
| 24 | 5'-trifluoromethyl-2'-fluoro-5-chloro-3-(4-chlorophenyl)salicylanilide. | 100 |
| 25 | 5'-nitro-2',5-dichlorosalicylanilide (255–256). | 0 |
| 26 | 5'-nitro-2'-methyl-3,5-dichlorosalicylanilide (200). | 0 |
| 27 | 2',5,5'-trichloro-3-(4-chlorophenyl)salicylanilide (214–215). | 0 |
| 28 | 4'-nitro-3',5-dichloro-3-phenylsalicylanilide. | 100 |
| 29 | 4'-nitro-3'-trifluoromethyl-5-chloro-3-phenylsalicylanilide. | 100 |
| 30 | 4'-nitro-3'-trifluoromethyl-5-chloro-3-(4-chlorophenyl)salicylanilide. | 100 |
| 31 | 4'-nitro-3'-trifluoromethyl-5-chlorosalicylanilide (197–199). | 0 |
| 32 | 3'-trifluoromethyl-4'-fluoro-5-chloro-3-(4-chlorophenyl)salicylanilide (145–147). | 30 |
| 33 | 3'-trifluoromethyl-5-chloro-3-(4-chlorophenyl)salicylanilide (148–149). | 0 |
| 34 | 3'-trifluoromethyl-4',5-dichloro-3-(4-chlorophenyl)salicylanilide (166–169). | 0 |
| 35 | 3',4',5-trichloro-3-(4-chlorophenyl)salicylanilide (193–194). | 0 |
| 36 | 4'-methylsulfonyl-2',5-dichloro-3-(4-chlorophenyl)salicylanilide (241–244). | 0 |

Evaluation II

The compounds of this invention of the aforedescribed groups (a) and (b) which satisfy the formula

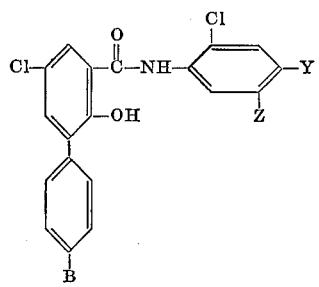

wherein B is hydrogen or, and preferably, chloro, and wherein Y and Z are unlike members of the group hydrogen and nitro, are particularly useful in destroying amphibious gastropods by application of same to their water environ in that they exhibit quick kills therein. For example, three snails (*Planobarius corneus* which is the species of snail host of the cyclococlid *Tracheophilus sisowi*, the blood fluke *Bilharziella polonica* and several other trematodes) of 6 to 8 weeks of age are placed in a 200 x 32 mm. glass tube (two replicates each of said three snails) and thereto is added the compound to be evaulated in the form of an aqueous dispersion thereof having a concentration of 0.1 part per million, that is p.p.m. (This dispersion is prepared by dissolving and/or dispersing sufficient of the particular compound in 10 ml. of acetone to make a one percent by weight solution or mixture thereof and then adding sufficient water to give dispersions of the following tabulated concentration.) The percent kill (that is the average of two replicates each of said three snails) at the exposure time of 6 hours at 80° F. for each of the following itemized compounds at a 0.1 part per million concentration was found to be as follows:

| No. | Compound | Percent kill at 0.1 p.p.m. |
|---|---|---|
| 10 | 4'-nitro-2',5-dichlorosalicylanilide. | 17 |
| 11 | 4'-nitro-2',5-dichloro-3-methylsalicylanilide. | 17 |
| 6 | 4'-nitro-2',5-dichloro-3-phenylsalicylanilide. | 67 |
| 22 | 5'-nitro-2',5-dichloro-3-(4-chlorophenyl)salicylanilide. | 100 |
| 8 | 4'-nitro-2',5-dichloro-3-(4-chlorophenyl)salicylanilide. | 75 |

In the same Evaluation II at the end of 6 hour exposure at 80° F. but employing the snail species *Australorbis glabratus*, an innerhost of *Schistosoma mansoni* which is the cause of bilharziosis, 100 percent kills were obtained employing Compound Nos. 6, 22 and 8 above identified at a concentration of 0.1 part per million, respectively.

In combatting the aquatic gastropods it is necessary to apply the gastropodicide to the waters or land areas adjacent thereto which form their habitats, and therefore to be practical the compounds of this invention must exhibit gastropodicidal activity at relatively high dilutions, for example $10^{-13}$ to $10^{-8}$ by weight.

In combatting the amphibious Gastropoda the compounds of this invention can be employed per se or formulated into a dust and dispersed or scattered on the ground along banks of streams, rivers, irrigation canals, or the edges of other bodies of water, e.g. the seashore, so that the amphibious Gastronoda will come in contact with the gastropodicidal agent when it leaves the water and begins to travel across ground areas.

Where the Gastropoda, whether aquatic or amphibious, sought to be combatted has a water habitat the compounds of this invention can be added per se to the water, or in the form of a formulated dust cast on the surface of the water, or sprayed on the water in the form of a solution thereof or a liquid emulsion formulation thereof.

Inert finely divided inert solid for the formulation of gastropodicidal dusts of this invention include fuller's earth, diatomaceous earth, bentonite, talc, pyrophillite, soybean flour, wood fluor, and walnut shell flour, which dusts preferably have a particle size of 5 microns or below and contain from 5 to 95 percent by weight of a compound of this invention. Ordinarily such dusts will be applied at the rate of about 10 to 50 pounds of gastropodicidal agent per acre of surface area. These dusts based on the total weight thereof can also contain from 1 to 15 percent by weight of an anionic, or non-ionic surfacant or mixtures thereof to provide a "wettable" dust formulation. Liquid formulations can be prepared by dissolving the compounds of this invention in a suitable organic solvent such as acetone or butanone and sprayed as such or in admixture with a non-ionic or anionic surfactant or mixtures thereof to form a liquid emulsion formulation for spray purposes.

In all of the forms described above the formulations can be provided ready for use in combatting gastropods or they can be provided in a concentrated form suitable for mixing with or dispersing in other extending agents. As illustrative of a particularly useful concentrate is an intimate mixture of a compound of this invention with a water-soluble surfactant either non-ionic or anionic or mixtures thereof which lowers the surface tension of water in the weight proportions of 0.1 to 15 parts of surfactant with sufficient of a compound of this invention to make 100 parts by weight. Such a concentrate is particularly adapted to be made into a spray for destroying various forms of gastropods by the addition of water thereto. As illustrative of such a concentrate is an intimate mixture of 5.0 parts by weight of 2',5-dichloro-5'-nitro-3-(4-chlorophenyl)salicylanilide and 50 parts by weight of a water-soluble non-ionic surfactant such as polyoxyethylene derivative of sorbitan monolaurate.

Another useful concentrate adapted to be made into a spray for combatting gastropods is a solution (preferably as concentrated as possible) of a compound of this invention in an organic solvent therefor, for example acetone, cyclohexanone or acetophenone. The said liquid concentrate preferably contains dissolved therein a minor amount (e.g. 0.5 to 10 percent by weight of the weight of the new gastropodicidal agent) of a non-ionic, or anionic surfactant or mixtures thereof, which surfactant is also water-soluble. As illustrative of such a concentrate is a solution of 2',5-dichloro-4'-nitro-3-(4-chlorophenyl) salicylanilide in acetone which solution contains dissolved therein a water-soluble alkylarylsulfonate anionic surfactant, e.g. sodium dodecylbenzenesulfonate, or a water-soluble cationic surfactant of the $C_{12-22}$ fattyamine-ethyleneoxide condensate type.

Of the surfactants aforementioned in preparing the various emulsifiable, wettable or dispersible compositions or concentrates of this invention, the water-soluble anionic and non-ionic surfactants described in U.S. 2,846,398 are preferred. Of the anionic surfactants, the particularly preferred are the well-known water-soluble alkali metal alkylarylsulfonates as exemplified by sodium decylbenzenesulfonate and sodium dodecylbenzenesulfonate. Of the non-ionic surfactants the particularly preferred are the water-soluble polyoxyethylene derivataives of alkylphenols (particularly isooctylphenol) and the water-soluble polyoxyethylene derivatives of the mono-higher fatty acid esters of sorbitan containing 15 to 30 moles of ethylene oxide per mole of sorbitan mono-ester of a higher fatty acid e.g. oleic acid.

In all of the various dispersions described hereinbefore for gastropodicidal purposes, the active ingredients can be one or more of the compounds of this invention. The compounds of this invention can also be advantageously employed in combination with other pesticides, including, for example, nematocides, bacterocides, and insecticides. In this manner it is possible to obtain mixtures which are effective against a wide variety of pests and other forms of noxious life.

The actual effective concentration of the compound of this invention for gastropodicidal purposes will depend upon the particular Gastropoda, weather conditions, and whether it is to be applied directly to the water which froms the habitat for the Gastropoda or to land areas which are crossed by amphibious Gastropoda either as the compound per se or in the form of formulations thereof. Those skilled in this art can readily determine the proper concentration for any particular application by knowing the particular dilution factor, which is generally expressed as the maximum aqueous dilution which will produce a 50% kill at a dilution of one part by weight per 8000 parts by weight of water (note—U.S. 2,703,301 which issued Mar. 1, 1955).

While this invention has been described with respect to certain embodiments it is to be understood that it is not so limited and that variations and modifications thereof obvious to those skilled in the art can be made without departing from the spirit or scope of this invention.

The embodiments of the invention in which an exclusive property or privilege is claimed are defined as follows:

1. A substituted 5-halo-3-phenylsalicylanide of the structural formula

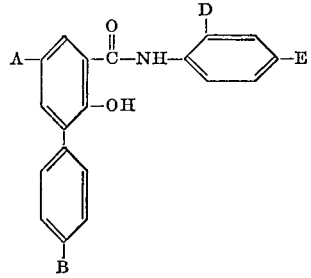

wherein A is halogen of atomic weight in the range of 35 to 80; wherein B is selected from the group consisting of hydrogen and halogen of atomic weight in the range of 35 to 80; wherein D is selected from the group consisting of hydrogen, methyl and halogen of atomic weight in the range of 18 to 80; wherein E is cyano; and wherein at least one of B and D is halogen.

2. A compound of claim 1 wherein B is halogen of atomic weight in the range of 35 to 80, and wherein D is halogen of atomic weight in the range of 18 to 80.

3. 2',5 - dichloro-4'-cyano-3'-4-chlorophenyl) - salicylanilido.

References Cited

UNITED STATES PATENTS 3,249,637    5/1966    Early et al. _____ 260—559

CHARLES B. PARKER, Primary Examiner

D. H. TORRENCE, Assistant Examiner

U.S. Cl. X.R.

260—520, 559 S, 578; 424—304, 324

UNITED STATES PATENT OFFICE
CERTIFICATE OF CORRECTION

Patent No. 3,636,038          Dated January 18, 1972

Inventor(s) Jack D. Early and John P. Chupp

It is certified that error appears in the above-identified patent and that said Letters Patent are hereby corrected as shown below:

Column 2, line 42, that part of the chemical name reading "salicyclic" should read -- salicylic --.

Column 3, immediately following "4'-cyano-2'-fluoro-5-chloro-3-(4-chlorophenyl)salicylanilide," at lines 39-40, there should be inserted -- 4'-cyano-2'-methyl-5-chloro-3-(4-chlorophenyl)salicylanilide, --.

Column 3, line 51, that part of the chemical name reading "bormophenyl" should read -- bromophenyl --.

Column 4, line 32, the word "analogous" should read -- analogues --.

Column 4, line 41, the word "cyclocoolid" should read -- cyclocoelid --.

Column 5, line 50, the word "cyclococlid" should read -- cyclocoelid --.

Column 5, line 54, the word "evaulated" should read -- evaluated --.

Column 6, line 8, the word "gastropods" should read -- Gastropoda --.

Column 6, line 13, the portion of the sentence reading "$10^{-13}$" should read -- $10^{-5}$ --.

Column 6, line 19, the word "Gastronoda" should read -- Gastropoda --.

Column 6, line 31, the word "fluor" should read -- flour --.

Column 6, line 60, "5.0" should read -- 50 --.

Column 6, line 61, "50" should read -- 5.0 --.

Column 8, lines 33 and 34, Claim 3 should read -- 2',5-dichloro-4'-cyano-3-(4-chlorophenyl)-salicylanilide. --.

Signed and sealed this 23rd day of January 1973.

(SEAL)
Attest:

EDWARD M. FLETCHER, JR.
Attesting Officer

ROBERT GOTTSCHALK
Commissioner of Patents